H. R. HUGHES.
ROTARY BORING DRILL.
APPLICATION FILED NOV. 1, 1916.
1,238,407.
Patented Aug. 28, 1917.
2 SHEETS—SHEET 1.
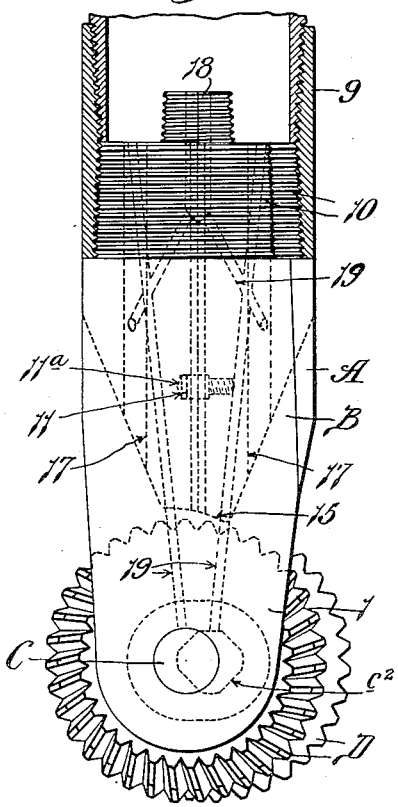
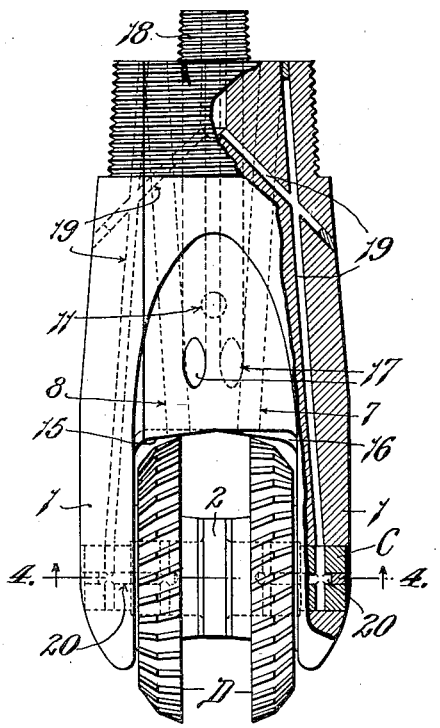
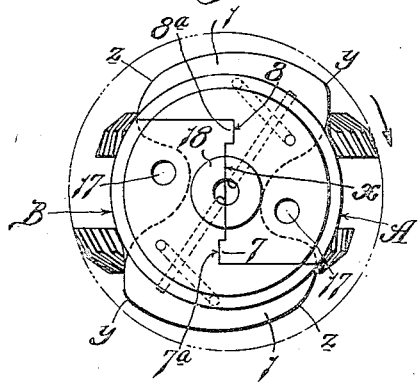
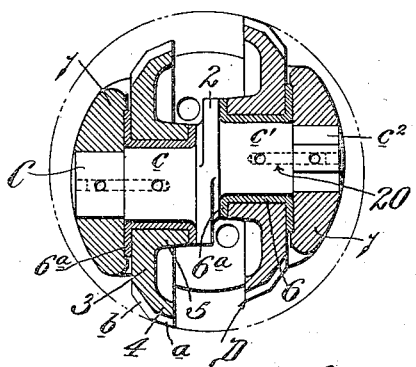
Inventor,
Howard R. Hughes.
By Bakewell & ... attys.

H. R. HUGHES.
ROTARY BORING DRILL.
APPLICATION FILED NOV. 1, 1916.
1,238,407.
Patented Aug. 28, 1917.
2 SHEETS—SHEET 2.
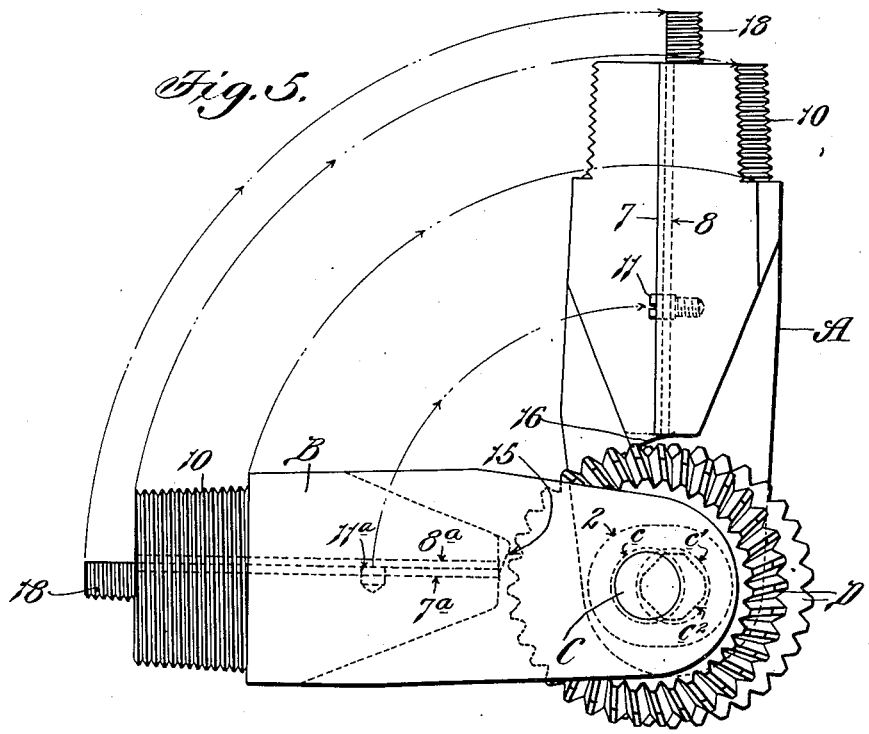
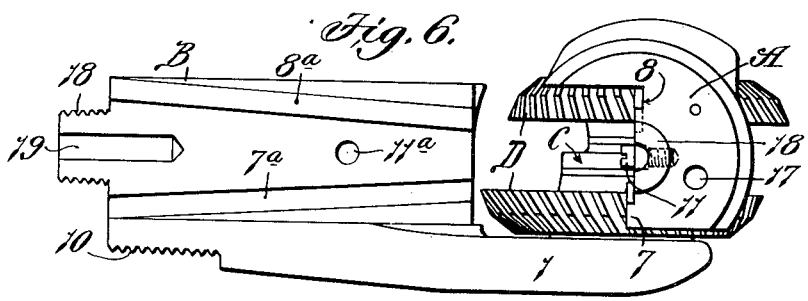
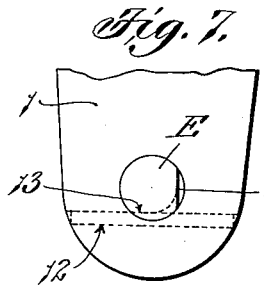 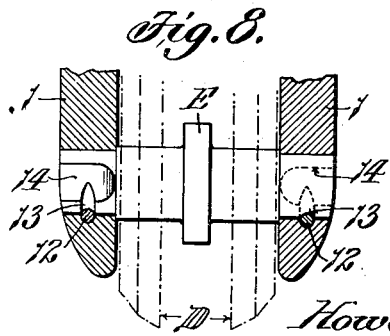
Inventor,
Howard R. Hughes.
By Bakewell & Cornwall, Attys.

UNITED STATES PATENT OFFICE.

HOWARD R. HUGHES, OF HOUSTON, TEXAS, ASSIGNOR TO HUGHES TOOL COMPANY, OF HOUSTON, TEXAS, A CORPORATION OF TEXAS.

ROTARY BORING-DRILL.

1,238,407.  Specification of Letters Patent.  Patented Aug. 28, 1917.

Application filed November 1, 1916. Serial No. 128,917.

*To all whom it may concern:*

Be it known that I, HOWARD R. HUGHES, a citizen of the United States, residing at Houston, Texas, have invented a certain new and useful Improvement in Rotary Boring-Drills, of which the following is a full, clear, and exact description, such as will enable others skilled in the art to which it appertains to make and use the same.

This invention relates to rotary boring drills of the type in which the head of the drill is equipped with substantially disk-shaped rotatable cutters that are arranged in an upright position on the lower portion of the head.

One object of my present invention is to provide a drill of the general type referred to that comprises only a few rugged parts which can be assembled or disassembled easily without the aid of a special tool.

Another object is to provide a rotary boring drill that is equipped with removable cutters which are mounted on the head in such a manner that there is no liability of the cutters or any parts of the drill working loose and becoming detached when the drill is in service.

Another object is to provide a drill which is so constructed that ample clearance is provided between the cutters, around the cutters and between the exterior of the head and the side wall of the hole for the disintegrated material that is flushed out of the hole during the drilling operation, thereby eliminating the possibility of the disintegrated material becoming packed around the cutters or around the head sufficiently to prevent the cutters from rotating or the head from turning freely in the hole.

And still another object is to provide a rotary boring drill of novel construction, in which the cutters and the flushing water passageways in the head are so arranged that the cuttings, namely, the material disintegrated by the cutters, will be mixed thoroughly and converted into a mud that will escape freely from the hole. Other objects and desirable features of my invention will be hereinafter pointed out.

Figure 1 of the drawings is a side elevational view of a rotary boring drill constructed in accordance with my invention.

Fig. 2 is a front elevational view of said drill, partly broken away.

Fig. 3 is a top plan view of the drill.

Fig. 4 is a horizontal sectional view, taken on the line 4—4 of Fig. 2, looking in the direction indicated by the arrows.

Fig. 5 is a side elevational view of the drill, showing one section of the head arranged in a horizontal position, preparatory to moving it upwardly into engagement with the other section, during the operation of assembling the parts of the drill.

Fig. 6 is a top plan view of the parts shown in Fig. 5.

Fig. 7 is a side elevational view of a portion of one section of the head, illustrating another way of mounting the cutter shaft in the head.

Fig. 8 is a vertical sectional view, illustrating more clearly the cutter shaft mounting shown in Fig. 7; and Fig. 9 is a perspective view of a portion of the cutter shaft shown in Fig. 8.

I have herein illustrated my invention embodied in a drill equipped with two vertically-disposed, rotatable cutters that are arranged between portions on the head of the drill that support the ends of an offset shaft on which the cutters are mounted, but I wish it to be understood that my broad idea is not limited to a drill of the particular construction herein shown, as certain features of my invention are applicable to rotary boring drills in which the coöperating parts are arranged in various ways. As shown in the drawings, which illustrate the preferred form of my invention, the head of the drill is composed of two sections A and B that are provided with coöperating portions 1 which form bearings or supports for the opposite ends of a horizontally-disposed shaft C on which two substantially disk-shaped cutters D are rotatably mounted, said cutters being spaced away from each other, as shown in Fig. 2. The shaft C, which is preferably formed in one piece, is offset, or, in other words, is provided with two portions $c$ and $c'$ that lie in the same horizontal plane but in different vertical planes, as shown in Fig. 4, so that the cutters D will be offset or staggered slightly with relation to each other, and said shaft is provided intermediate its ends with an integral collar 2 that serves as a spacing device and end thrust bearing for the cutters. Any suitable type of rotatable cutter may be used, but I prefer to equip the drill with cutters of the construction shown in Fig. 4, wherein it will be noted that each cutter has a relatively thin body portion 3 of substantially disk shape that is provided at its periphery with a laterally-projecting flange 4 and at its center with a relatively long hub 5. The cutting surface of the cutter is formed by substantially helical chisel teeth on the periphery of the cutter, one set of teeth *a* being arranged on the flange 4 and a different set of teeth *b*, which are disposed at an angle to the teeth *a*, being arranged on the periphery of the body portion 3 of the cutter. The hub of the cutter is provided with a bushing 6 having flanges $6^a$ at the ends thereof which bear against one side of the thrust collar 2 on the cutter shaft and against the inner side of one of the shaft bearing portions on the head when the two sections of the drill head are assembled, as shown in Fig. 4.

The main joint or dividing line *x* between the two sections A and B of the head lies in a vertical plane parallel to the longitudinal axis of the cutter shaft D, as shown in Fig. 3, and means are provided on the meeting faces of the sections A and B to prevent said sections from moving vertically relatively to each other and also relatively to each other in a direction longitudinally of the cutter shaft. In the form of my invention herein shown said means consists of a rib 7 and a groove 8 in the section A of the head that project into and receive respectively a groove $7^a$ and a rib $8^a$ on the section B of the head when said sections are properly positioned with relation to each other, said coöperating ribs and grooves being inclined oppositely to each other as shown in Fig. 6. It will, of course, be understood that various other means could be used for preventing relative movement of the two sections of the head without departing from the spirit of my invention. The two sections of the head are locked securely together by the drill collar 9 that connects the drill to the drill stem (not shown), said collar being screwed onto coöperating screw-threaded portions 10 at the upper ends of the sections A and B. Means is also provided to assist the oppositely-inclined ribs and grooves 7, 8 and $7^a$ and $8^a$ to prevent one section of the head from moving vertically with relation to the other section, such, for example, as a dowel pin 11 on the section A that fits in a hole $11^a$ in the section B. The shaft-bearing portions 1 on the two sections of the head extend laterally beyond the main dividing line or joint *x* between said sections so as to form rigid one-piece bearings for the cutter shaft C, and when the sections of the head are assembled, as shown in Fig. 3, the shaft-bearing portion 1 on the section A laps over the section B and the shaft-bearing portion 1 on the section B laps over the section A. In other words, while the main dividing line or joint *x* between the two sections of the head lies in a vertical plane parallel to the longitudinal axis of the cutter shaft, each of said sections is provided with a portion that projects laterally some distance beyond the main dividing line and laps over the other section of the head, thereby producing a two-part drill head which is divided longitudinally by a main joint that lies in a plane parallel to the longitudinal axis of the cutter shaft and two other joints that lie in vertical planes which are disposed at substantially right angles to the cutter shaft.

In assembling the drill the cutters D are first slipped onto the shaft C, and one end of said shaft is inserted in the opening provided for same in the shaft-bearing portion 1 of the section A. The other section B of the head is then arranged in approximately the position shown in Fig. 5, and the shaft-bearing portion 1 of same is slipped onto the opposite end of the cutter shaft C. Thereafter, the section B is swung upwardly into engagement with the section A, as indicated by the arrows in Fig. 5, so as to cause the coöperating elements on the meeting faces of said sections to interlock, and finally, the drill collar 9 is screwed onto the externally screw-threaded portions 10 on said sections, so as to securely lock said sections together. The cutter shaft C can be prevented from rotating or turning in the head in various ways, it can either be provided at one end with a non-circular shaped portion $c^2$ that fits in a correspondingly shaped hole in the shaft-bearing portion 1 of the section A and at its opposite end with a circular portion on which the section B can be revolved, or rather oscillated, during the operation of assembling the drill, as shown in Figs. 1 to 6, inclusive, or means can be provided for securely locking both ends of the cutter shaft to the two shaft-bearing portions 1 in the head. One convenient way of constructing the drill so as to securely lock both end portions of the cutter shaft and also cause said shaft to act as a tie member that coöperates with the interlocking elements on the meeting faces of the sections A and B to prevent the shaft-bearing portions 1 on the head from springing apart is illustrated in Figs. 7, 8 and 9 of the drawings, wherein it will be noted that each end of the cutter shaft E is keyed to the shaft-bearing portion 1 on the drill head that receives same by means of a device 12 in said portion that fits in a transversely-disposed groove 13 in the cutter shaft.

In the form of my invention shown in Figs. 7, 8 and 9, the device 12 consists of a pin that is securely connected to the shaft-bearing portion 1 preferably by means of a drive fit, and it is so arranged that it extends into the opening in the portion 1 that receives the end of the cutter shaft. The cutter shaft is provided at its end with a flat portion 14, so that the shaft can be inserted in the opening in the shaft-bearing portion 1, when said shaft is arranged in such a position that the flat portion 14 on same is positioned on the underside of the shaft above the pin 12. After the shaft has been inserted in the opening in the shaft-bearing portion 1, the shaft is given a quarter turn, so as to cause the transversely-disposed groove 13 therein to move downwardly into engagement with the pin 12. While I prefer to key the shaft E in the shaft bearing portions 1 by means of pins that are driven into said portions, I wish it to be understood that it is immaterial, so far as my broad idea is concerned, what particular type of keying devices the shaft bearing portions 1 are provided with to coöperate with the grooves 13 in the shaft. Furthermore, while I prefer to provide the shaft with transversely-disposed grooves that receive keying devices on the shaft bearings, this is not essential, so long as the shaft E and the bearings 1 are constructed in such a manner that the shaft can be locked in said bearings by turning either the shaft or the bearings 1 in a certain direction. A drill of the construction above described can be assembled and disassembled as easily as a drill of the construction illustrated in Figs. 1 to 6 by first locking the cutter shaft in the shaft-bearing portion of the section A and then mounting the shaft-bearing portion of the section B on the opposite end of the shaft and swinging it upwardly into operative position, the movement of said section B causing the pin 12 in the shaft-bearing portion 1 of same to move into the transversely-disposed groove 13 in the cutter shaft.

In order to eliminate the possibility of the cuttings becoming clogged between the cutters and the head, and thus preventing the cutters from rotating freely, I have formed the head in such a manner that the clearance space between the peripheries of the cutters and the portion of the head that lies directly above the cutters increases progressively in the direction of rotation of the cutters. As shown in Figs. 1 and 5, the top wall of the cut-out portion or opening in the head that receives the cutters D is provided with oppositely-inclined surfaces 15 and 16, the surface 15 lying directly above one of the cutters and the surface 16 lying directly above the other cutter. Said surfaces 15 and 16 are so disposed with relation to the cutters with which they coöperate that the space between each of said surfaces and its co-operating cutter increases progressively in the direction of rotation of the cutter. Consequently, any disintegrated material that passes through the narrow portion of the space, or, in other words, the mouth of the space, will have plenty of room to pass freely through the remainder of the space, owing to the fact that the top wall of the space slopes upwardly away from the periphery of the cutter. I also prefer to form the outer surface of the drill head in this same manner, so as to reduce the tendency of the disintegrated material to become clogged between the periphery of the head and the side wall of the hole. As shown in Fig. 3, the periphery of the head, instead of being made concentric with the axis of rotation of the drill, is arranged slightly eccentric, so that the two points $y$ on the exterior of the drill head will be located closer to the side wall of the hole than the two points $z$ on the exterior of the drill head. The drill rotates in the direction indicated by the arrow in Fig. 3. Consequently, any disintegrated material that passes between the points $y$ on the head and the side wall of the hole will pass freely between the head of the drill and the side wall of the hole, owing to the fact that the portions of the outer surface of the drill head that lie at the rear of the points $x$ curve inwardly from the side wall of the hole.

The head of the drill is provided with water passageways 17 which extend downwardly through the head and terminate at the lower end of the head in such a manner that jets of water will be discharged directly upon the bottom of the hole, thus tending to facilitate the removal of the cuttings. As shown in Figs. 1 and 2, the head of the drill is provided with two water passageways 17 that terminate at opposite sides of the head between the cutters D. When the drill is in operation the jets of water that are discharged downwardly from the passageways 17 strike the bottom of the hole and cause the cuttings to be washed upwardly around the cutters D, and in view of the fact that said cutters revolve and are spaced some distance apart, the cuttings will be thoroughly mixed with the water, thus forming a mud that can escape freely upwardly through the hole formed by the drill.

The head of the drill is provided at its upper end with a portion 18 to which a lubricant holder (not shown) can be connected, and lubricating ducts are formed in the head and in the cutter shaft for supplying a lubricating medium to the bearings on which the cutters turn. In the drill herein shown each section A and B of the head is provided with lubricating ducts 19 that lead to a duct 20 in the cutter shaft which is provided with a plurality of branch ducts, but, if desired, only one section of the head can be provided with a lubricating duct that leads to one end of a distributing duct which extends longitudinally through the cutter shaft, so as to supply the lubricating medium to a plurality of branch ducts that lead to the bearings of the cutters.

A rotary boring drill of the construction above described comprises only a few rugged parts of simple design which are combined in such a manner that they can be taken apart and assembled easily without the aid of a special tool, when it becomes necessary to re-sharpen the cutters or substitute new cutters for broken or worn cutters, the disassembling of the drill being effected by simply removing the drill collar and then swinging the section B of the drill head downwardly and laterally, so as to release the cutter shaft and permit the cutters to be slipped off of same. The assembling of the parts of the drill can be effected by simply reversing the operations above described. By dividing the head of the drill longitudinally in a plane that extends parallel to the longitudinal axis of the cutter shaft and providing the meeting faces of the two sections of the head with coöperating interlocking portions, I obtain a split head which is so strong and rigid that there is no liability of the two sections of same spreading apart when the drill is in service. Still another desirable feature of such a drill is that both cutters are mounted on a single shaft which is mounted in the head in such a manner that there is no liability of the cutters or any other parts of the drill working loose and dropping into the hole, as so often occurs with drills in which the cutters are mounted on shafts that are screwed into the head or held in the head by screw-threaded fastening devices. In my improved drill the shaft on which the cutters are mounted practically forms an integral part of the head when the parts of the drill are assembled, but the parts are so designed and arranged that they can be disassembled easily when it is desired to remove the cutters. The cutters are spaced far enough apart to eliminate the possibility of the cuttings becoming packed between same and also insure a thorough mixing of the cuttings and the water that strikes against the bottom of the hole and washes the cuttings upwardly around the cutters, and the head of the drill is of such form that there is little liability of the cuttings becoming packed between the cutters and the head or between the outer surface of the head and the wall of the hole. In addition to the desirable features above mentioned, a drill of the construction herein illustrated can be manufactured at a low cost, because the two sections of the head are of the same shape and dimensions, thus overcoming the necessity of using right and left hand sections, and no separate fastening devices are used to connect the cutter-supporting means to the head or to connect the two sections of the head together, the two sections of the head being securely locked by means of the drill collar that is used to connect the drill to the drill stem.

Having thus described my invention, what I claim and desire to secure by Letters Patent, is:

1. A rotary boring drill, comprising a longitudinally split head composed of two sections, each of which is provided with a complete shaft bearing, and a cutter-supporting shaft carried by said bearings, the main joint between said sections lying in a vertical plane parallel to the longitudinal axis of said shaft.

2. A rotary boring drill, comprising a split head, a rotatable cutter arranged in a substantially upright position between two side portions on said head that lie at opposite sides of said cutter, and a supporting means for said cutter carried by said side portions, each of said side portions being connected to a separate part of the head and the main dividing line between said parts extending in a plane parallel to the axis of rotation of the cutter.

3. A rotary boring drill, comprising a longitudinally split head composed of two sections, means for holding said sections together, and a cutter shaft, each of whose ends is supported by a complete shaft bearing on one section of the head, the sections of the head being provided with longitudinal grooves and coöperating ribs so that one section has to be rotated on said shaft relatively to the other section and then moved away from said other section in a direction longitudinally of said shaft when it is desired to remove the shaft.

4. A rotary boring drill, comprising a two-part head, a horizontally-disposed cutter shaft, a complete bearing on each part of the head, which bearings support the opposite ends of said cutter shaft, a pair of substantially disk-shaped cutters on said shaft that project laterally beyond the periphery of the head, and means for holding the two parts of the head together, the main line of division between said parts lying in a plane substantially parallel to the longitudinal axis of said shaft.

5. A rotary boring drill, consisting of a cutter shaft, substantially disk-shaped cutters mounted on said shaft, a longitudinally split head composed of two parts, divided by a vertical joint extending parallel to the longitudinal axis of said shaft and constructed in such a manner that they can be slipped longitudinally onto the opposite ends of said shaft and thereafter turned into operative engagement with each other, and means for holding said parts together.

6. A rotary boring drill, consisting of a cutter shaft, substantially disk-shaped cutters mounted on said shaft, a longitudinally split head composed of two parts, divided by a joint that lies in a vertical plane parallel to the axis of said shaft and constructed in such a manner that they are adapted to be slipped longitudinally onto the opposite ends of said shaft and thereafter brought into engagement with each other by rotating one part relatively to the other, a removable collar for holding the two parts of the head together, and coöperating means on the meeting faces of said parts for resisting relative movement of said parts in a direction longitudinally of said shaft.

7. A rotary boring drill, comprising a longitudinally split head composed of two sections, each of which is provided with a complete shaft bearing that is disposed at approximately right angles to the main line of division between said sections, a horizontally disposed cutter shaft supported by said bearings, and a drill collar that holds the sections of the head together.

8. A rotary boring drill, comprising a longitudinally split head composed of two sections, each of which is provided with a complete shaft bearing that is disposed at approximately right angles to the main line of division between said sections, a horizontally disposed cutter shaft supported by said bearings, a drill collar that holds the sections of the head together, and coöperating means on the meeting faces of said sections for preventing relative vertical movement and movement in a direction parallel to said shaft.

9. A rotary boring drill, comprising a pair of substantially disk-shaped cutters arranged in an upright position and staggered slightly with relation to each other, an offset shaft on which said cutters are rotatably mounted, and a longitudinally split head that supports said shaft and which is composed of two complementary parts whose main line of division lies in a vertical plane parallel to the longitudinal axis of said shaft.

10. A rotary boring drill, consisting of a longitudinally split head provided at its lower end with an opening, a pair of substantially disk-shaped cutters arranged in said opening, and a one-piece offset shaft for said cutters having its opposite end portions supported in complete one-piece bearings on the head that form the side walls of the opening in which the cutters are arranged, the head being composed of two parts whose main line of division lies in a vertical plane substantially parallel to the axis of the cutter shaft.

11. A rotary boring drill provided with a head composed of two complementary sections, each of which has a depending portion that forms a complete shaft bearing, a horizontally-disposed offset shaft supported by said bearings, and a pair of substantially disk-shaped cutters rotatably mounted on said shaft and spaced away from each other, the dividing line between the sections of the head being so formed that the inner face of each section comprises a plurality of surfaces that are disposed at substantially right angles to each other, and the central one of which lies in a vertical plane parallel to the longitudinal axis of the cutter shaft.

12. A rotary boring drill, comprising a head composed of two longitudinally divided sections provided in their meeting faces with coöperating means that prevents relative movement of said sections when they are assembled, a horizontally-disposed offset shaft arranged in approximately parallel relation to the main line of divison between the two sections of the head and having each of its end portions fitting in a complete one-piece bearing, and a drill collar that serves to hold the two sections of the head together and also connect the head of the drill to the stem by which the drill is operated.

13. A head for a rotary boring drill, comprising two sections divided by a joint extending longitudinally of the head, and a portion on each of said sections disposed at an angle to said joint and arranged so that it will lap over the other section and form part of the outer surface of the head when said sections are assembled.

14. A head for a rotary boring drill, comprising two longitudinally-divided sections which are of such cross-sectional shape that the dividing line between said sections is substantially Z-shaped and lies in a plurality of right-angularly-disposed, vertical planes.

15. A head for a rotary boring drill, comprising two complementary sections, each of which has a depending shaft bearing that is disposed at approximately right angles to the main line of division between said sections.

16. A split head for rotary boring drills composed of two longitudinally-divided sections provided with coöperating means that prevents said sections from moving relatively to each other in a direction parallel to the main line of division between said sections, and an integral portion on each of said sections that projects laterally from said main dividing line and laps over the other section so as to form part of the outer surface of the head.

17. A rotary boring drill, comprising a head provided with depending shaft bearings, a horizontally-disposed offset shaft arranged in said bearings and provided intermediate its ends with a collar, and cutters rotatably mounted on said shaft between said collar and bearings.

18. A rotary boring drill, comprising a two-part longitudinally-divided head, each part of which is provided with a depending shaft bearing, a horizontally-disposed cutter shaft arranged parallel to the main line of division between the parts of the head and keyed to said bearings, and means arranged at the upper end of the head for holding the parts of same together.

19. A rotary boring drill, comprising a head provided with a shaft bearing, a cutter shaft mounted in said bearing, and a keying device forming a fixed part of said bearing and that is adapted to project into a transverse groove in said shaft when said shaft is turned in one direction, one side of the shaft being cut away so as to pass the keying device.

20. A rotary boring drill, comprising a head provided with spaced shaft bearings, a cutter shaft arranged in said bearings, and pins in said bearings that fit in transverse grooves in the outer surface of said shaft and thus lock the shaft in position, the head being split into two parts along an irregular plane longitudinally of the same, the parts being pivoted on the shaft so that one part can be turned relatively to the other so as to disconnect one of said bearings from one end of the cutter shaft.

21. A rotary boring drill comprising a head composed of two sections, recesses in one end of the sections adapted to house cutting rollers, the bottom walls of the recesses being so arranged that the clearance between the periphery of the disks and said walls increases progressively in the direction of rotation of the disks.

22. A rotary boring drill, comprising a head, and a substantially disk-shaped cutter arranged in an upright position in an opening in the head, the wall of said opening that lies above the cutter being so inclined that the clearance between the head and the periphery of the cutter increases progressively in the direction of rotation of the cutter for the purpose described.

23. A rotary boring drill provided with a rotatable cutter that is arranged in an upright position, the cutting surface of said cutter being formed by two sets of substantially helical teeth that merge into each other and which are disposed at an angle to each other.

24. A rotary boring drill provided with a rotatable cutter that has a substantially disk-shaped body portion provided at its outer edge with a laterally-projecting flange, and teeth on said flange and on the edge of said body portion that are disposed at an angle to each other and which merge into each other.

25. A rotary boring drill, comprising a head provided with spaced shaft bearings, a horizontally-disposed shaft in said bearings provided intermediate its ends with a collar, a pair of substantially disk-shaped cutters on said shaft, each of which has a hub that is positioned between said collar and one of said shaft bearings, and teeth on the periphery of each cutter.

26. A head for a rotary boring drill, comprising two sections divided by a joint extending longitudinally of the head, and coöperating ribs and grooves on the meeting faces of said sections which are so formed that they prevent said sections from moving vertically relatively to each other or in a direction parallel to the main line of division between said sections.

27. A head for a rotary boring drill, comprising two sections divided by a joint extending longitudinally of the head, a rib and groove on one of said sections that are inclined oppositely to each other, and a correspondingly arranged groove and rib on the other section, said ribs and grooves coöperating with each other to prevent the two sections of the head from moving vertically with relation to each other or in a direction parallel to the main line of division between said sections.

HOWARD R. HUGHES.